(12) United States Patent
Simon et al.

(10) Patent No.: US 9,573,836 B2
(45) Date of Patent: Feb. 21, 2017

(54) BUSHING ASSEMBLY COMPRISING A DISTRIBUTION MANIFOLD

(71) Applicant: 3B-Fibreglass sprl, Battice (BE)

(72) Inventors: Philippe Simon, Battice (BE); Dimitri Laurent, Battice (BE); Utku Ahmet Özden, Aachen (DE); Christoph Broeckmann, Aachen (DE); Alexander Bezold, Aachen (DE)

(73) Assignee: 3B-Fibreglass sprl, Battice (BE)

( * ) Notice: Subject to any disclaimer, the term of this patent is extended or adjusted under 35 U.S.C. 154(b) by 0 days.

(21) Appl. No.: 14/404,760

(22) PCT Filed: May 17, 2013

(86) PCT No.: PCT/EP2013/060308
§ 371 (c)(1),
(2) Date: Dec. 1, 2014

(87) PCT Pub. No.: WO2013/178496
PCT Pub. Date: Dec. 5, 2013

(65) Prior Publication Data
US 2015/0143853 A1    May 28, 2015

(30) Foreign Application Priority Data

May 29, 2012   (EP) .................................... 12169809

(51) Int. Cl.
*C03B 37/08*    (2006.01)
*C03B 37/085*   (2006.01)

(52) U.S. Cl.
CPC ............. *C03B 37/085* (2013.01); *C03B 37/08* (2013.01)

(58) Field of Classification Search
CPC .... C03B 37/08; C03B 37/0805; C03B 37/083; C03B 37/085
See application file for complete search history.

(56) References Cited

U.S. PATENT DOCUMENTS

| 5,928,402 | A | 7/1999 | Mirth et al. |
| 6,221,506 | B1 * | 4/2001 | Guerlet .................. B21K 21/08 148/24 |

(Continued)

FOREIGN PATENT DOCUMENTS

| EP | 0054125 A1 | 6/1982 |
| EP | 0931026 A1 | 7/1999 |

(Continued)

*Primary Examiner* — Jason L Lazorcik
*Assistant Examiner* — Cynthia Szewczyk
(74) *Attorney, Agent, or Firm* — Avery N. Goldstein; Blue Filament Law PLLC (57) ABSTRACT

The present invention concerns a bushing assembly comprising: (a) a liquid glass feeding unit arranged upstream of and in fluid communication with, (b) a first and second tip plate assemblies (1A, 1B) extending along a longitudinal direction, arranged side by side, and each surrounded by side walls and end walls and, the first and second tip plate assemblies being separated from one another by a stiffening rib structure (21) extending along said longitudinal direction, characterized in that, the feeding unit comprises a glass distribution manifold (2), which defines two separate fluid communication paths to the first and second tip plate assemblies (1A, 1B), and in that, the stiffening rib structure (21) forms an integral part of the floor of the manifold (2).

11 Claims, 5 Drawing Sheets

(56) References Cited

U.S. PATENT DOCUMENTS 7,980,099 B2 * 7/2011 Harms ................. C03B 37/095
　　　　　　　　　　　　　　　　　　　　　　 65/374.12
2003/0000259 A1   1/2003 Bemis

FOREIGN PATENT DOCUMENTS

| FR | 2850964 A1 | 8/2004 |
| WO | 9316008 A1 | 8/1993 |
| WO | 9958460 A1 | 11/1999 |
| WO | 0001630 A1 | 1/2000 |
| WO | 2009128749 A1 | 10/2009 |

* cited by examiner

BUSHING ASSEMBLY COMPRISING A DISTRIBUTION MANIFOLD

TECHNICAL FIELD

The present invention relates to glass fibre manufacturing equipment. In particular it concerns a bushing assembly providing efficient reinforcement of the tip plates and excellent homogenization of the molten glass with a design permitting to reduce the amount of expensive alloys used for its manufacturing.

BACKGROUND OF THE INVENTION

Glass fibres can be produced by melting a glass composition in a melter and drawing them out through the tip plate of a bushing assembly. A bushing assembly is generally in the form of a rectangular box with two pairs of opposite side and end walls forming the perimeter thereof with an opening at the top in fluid communication with the melter. The bottom floor comprises a tip plate which is a plate comprising a multitude of orifices or tips through which the glass melt can flow to form fibres, which are attenuated to reach their desired diameter. To ensure an optimal control of the glass composition and viscosity, the molten glass must be well homogenized and the temperature of the tip plate must be controlled accurately. The temperature of the tip plate depends on the glass melt composition but is generally well above 1000° C. Because of the extreme working conditions, the various components of a bushing assembly are made of platinum or platinum alloys, typically rhodium-platinum alloys. The amounts of such expensive alloys used in the manufacturing of bushing assemblies is therefore of economical concern, even though most of the material can be recycled, since a larger material pool is required at the premises of the bushing manufacturer to ensure a continuous supply of bushing assemblies.

The load applied on the tip plate is substantial with, on the one hand, the weight of the glass melt lying on top of it and, on the other hand, the drawing force applied to the fibres below. At temperatures well above 1000° C., it is not surprising that tip plates are sensitive to creep and sagging. In order to increase the production rate, larger tip plates are being used which increase the problem of creep and sagging. For this reason, beside the use of transverse gussets distributed along the length of the tip plate, a longitudinal central stiffening rib is often provided in the centre of the floor to stiffen the tip plate in the longitudinal direction; this configuration corresponds to having two tip plates in parallel separated by a longitudinal beam in a single bushing assembly. Usually, the two tip plate portions and the central beam are made of a single plate folded appropriately. The central beam may, however, be welded to the centre of the top surface of a single tip plate or to the longitudinal edges of two separate tip plates. Examples of bushing assemblies comprising a central stiffening rib, dividing the floor of the bushing assembly into two tip plates are disclosed in WO2000/001630, WO2009/128749, WO9958460, or EP0931026.

The homogeneity of the glass melt composition and temperature can be improved before it reaches the tip plate(s) by splitting the flow by interposing baffles and perforated screens in the flow path. U.S. Pat. No. 5,928,402 discloses a multi-screen mixing apparatus for a bushing assembly including a first, upstream screen having openings located at a first portion thereof through which the glass melt must flow and a second, downstream screen having openings located at a second portion thereof offset with respect to the first portion of the upstream screen, such that the molten glass must flow in a non-linear path as it passes through the screens. WO2000/001630 discloses a glass fibre production assembly comprising multiple perforated screens arranged along the flowpath of molten glass from the furnace down to the tip plate, with a diverter (44) arranged just above the bushing assembly and tip plates separated by a central rib. Similarly, WO2009/128749 discloses a glass fibre production assembly with multiple screens laid on the flow path of molten glass from a source of molten glass to two tip plates separated by a central stiffening rib. WO200811298 discloses a tip plate being separated from a source of molten glass by a zigzagging screen and EP1509478 by a flat screen. US20071220923 discloses a flow diverter (340) from a furnace and a bushing assembly. U.S. Pat. No. 4,525,188 discloses a bushing assembly wherein molten glass is fed to the tip plates through a plurality of tubular feed inlets through a top cover chamber. U.S. Pat. No. 4,537,609 discloses a bushing assembly provided with a baffle assembly separating a source of molten glass from the tip plate. In all the foregoing bushing assemblies, the features for stiffening the tip plate(s) are distinct from the ones used for homogenizing the glass melt, which results in the use of higher amounts of expensive alloys. EP0931026 discloses a bushing assembly wherein the tip plate is reinforced by a series of adjacent and perforated A-shaped ribs. In this configuration the A-shaped ribs ensure both functions of stiffening the tip plate and splitting the molten glass flow to homogenize the composition and temperature thereof.

The present invention provides a new design for bushing assemblies, allowing an efficient reinforcement of the tip plates and excellent homogenization of the molten glass while reducing the amount of expensive alloys used for its manufacturing. This and other advantages of the present invention are presented in continuation.

SUMMARY OF THE INVENTION

The present invention is defined in the appended independent claims. Preferred embodiments are defined in the dependent claims. In particular, the present invention concerns a bushing assembly comprising:
(a) a liquid glass feeding unit arranged upstream of, and in fluid communication with,
(b) a first and second tip plate assemblies extending along a longitudinal direction, arranged side by side, and each surrounded by side walls and end walls and, the first and second tip plate assemblies being separated from one another by a stiffening rib structure extending along said longitudinal direction, characterized in that, the feeding unit comprises a glass distribution manifold, which defines two separate fluid communication paths to the first and second tip plate assemblies, and in that, the stiffening rib structure forms an integral part of the floor of the manifold.

In a preferred embodiment, each of the separate paths from the manifold to each of the first and second tip plate assemblies comprises a grid or perforated plate through which the liquid glass must flow to reach each tip plate assembly. To enhance even further the homogeneity of the glass melt it is preferred that the glass distribution manifold be in fluid communication with a source of liquid glass located upstream through a grid or perforated plate. The manifold and various screens or perforated plates impose numerous changes in directions to, and splitting of the flow, thus improving the homogeneity in concentration and temperature of the melt. Each of the first and second tip plate assemblies is closed on the top by a ceiling separating the tip plate assembly from the source of liquid glass. It is preferred that said ceiling be sloping towards the grid or perforated plate separating said source from the manifold to force the liquid glass flow down to the manifold.

The stiffening rib structure separating the two tip plate assemblies and forming the floor of the manifold can have a cross section in the shape of a Λ or ∩, with the apex or convex side facing the interior of the manifold receiving the liquid glass. No liquid is supposed to flow through the stiffening rib structure. It follows that the stiffening rib structure should preferably be impervious to the liquid glass. It is preferably made of metal and the bottom thereof can be further supported by a core made of refractory material. Additional, metal supports can be coupled to the refractory core to further reinforce the stiffening rib structure.

The tip plate assemblies comprise a floor formed by a tip plate surrounded by peripheral walls and closed on top by a ceiling. Screens or perforated panels define flow paths towards the manifold. The shape of the tip plate may vary. In one embodiment, each of the first and second tip plate assemblies comprises a single, substantially rectangular tip plate. In an alternative embodiment, each of the first and second tip plate assemblies comprises at least two tip plate modules aligned in fluid communication with each other along the longitudinal direction. Two adjacent modules of a given tip plate assembly are preferably in fluid communication with one another, either through an opening, or through a screen or perforated plate. Each module may comprise a polygonal tip plate. In a preferred embodiment, each tip plate module comprises a polygonal tip plate of more than four edges, preferably of six edges, with two adjacent modules sharing a common edge of said polygon. This configuration enhances the resistance to creep of the tip plate. Creep resistance can be further enhanced by providing a series of parallel stiffening gussets extending substantially normal to the longitudinal direction and mechanically coupled to the tip plates and to at least one side wall adjacent the corresponding tip plates.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

Figure 1:
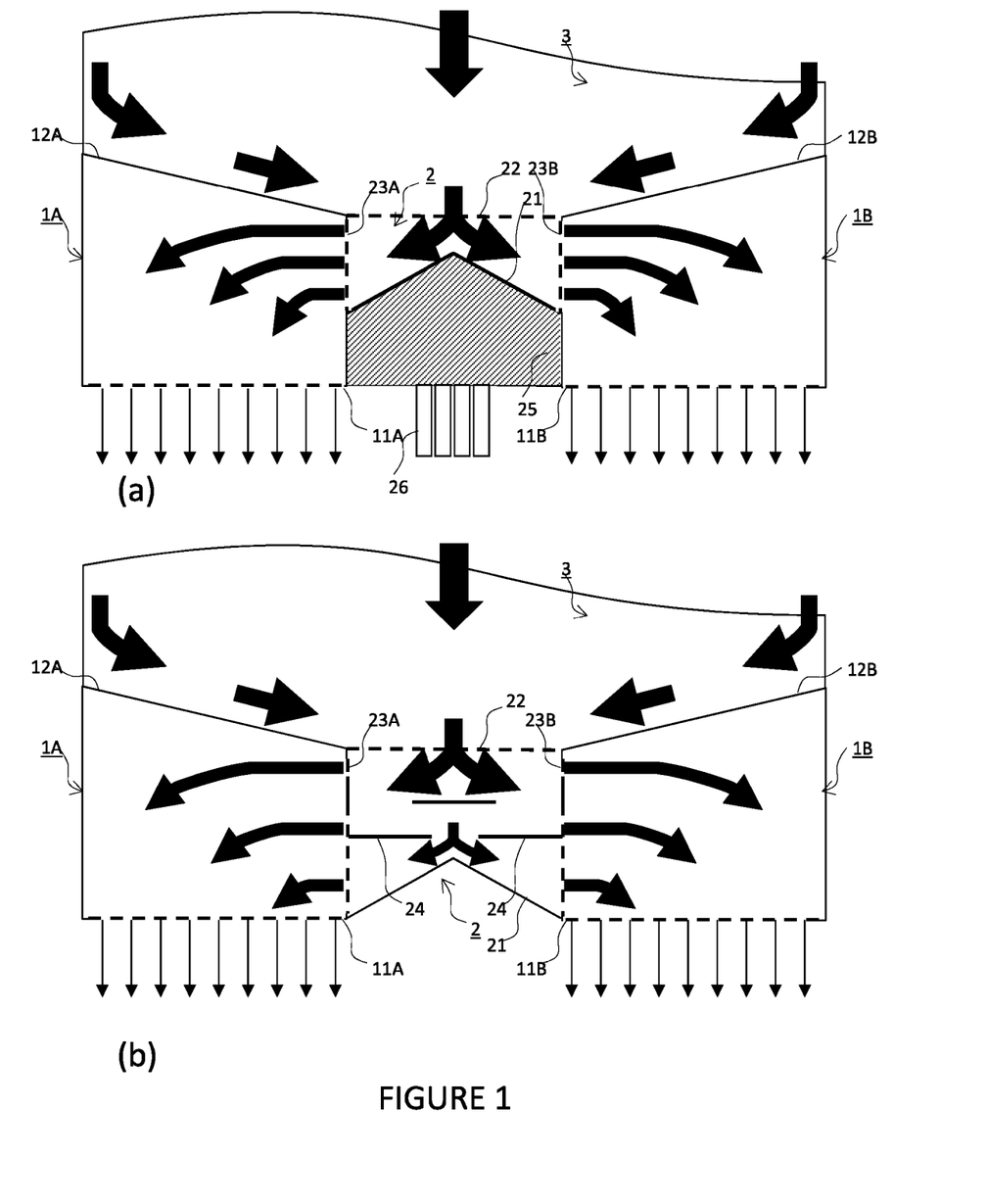
FIG. 1: shows cross sectional views normal to the longitudinal direction of bushing assemblies according to two embodiments of the present invention.
Figure 2:
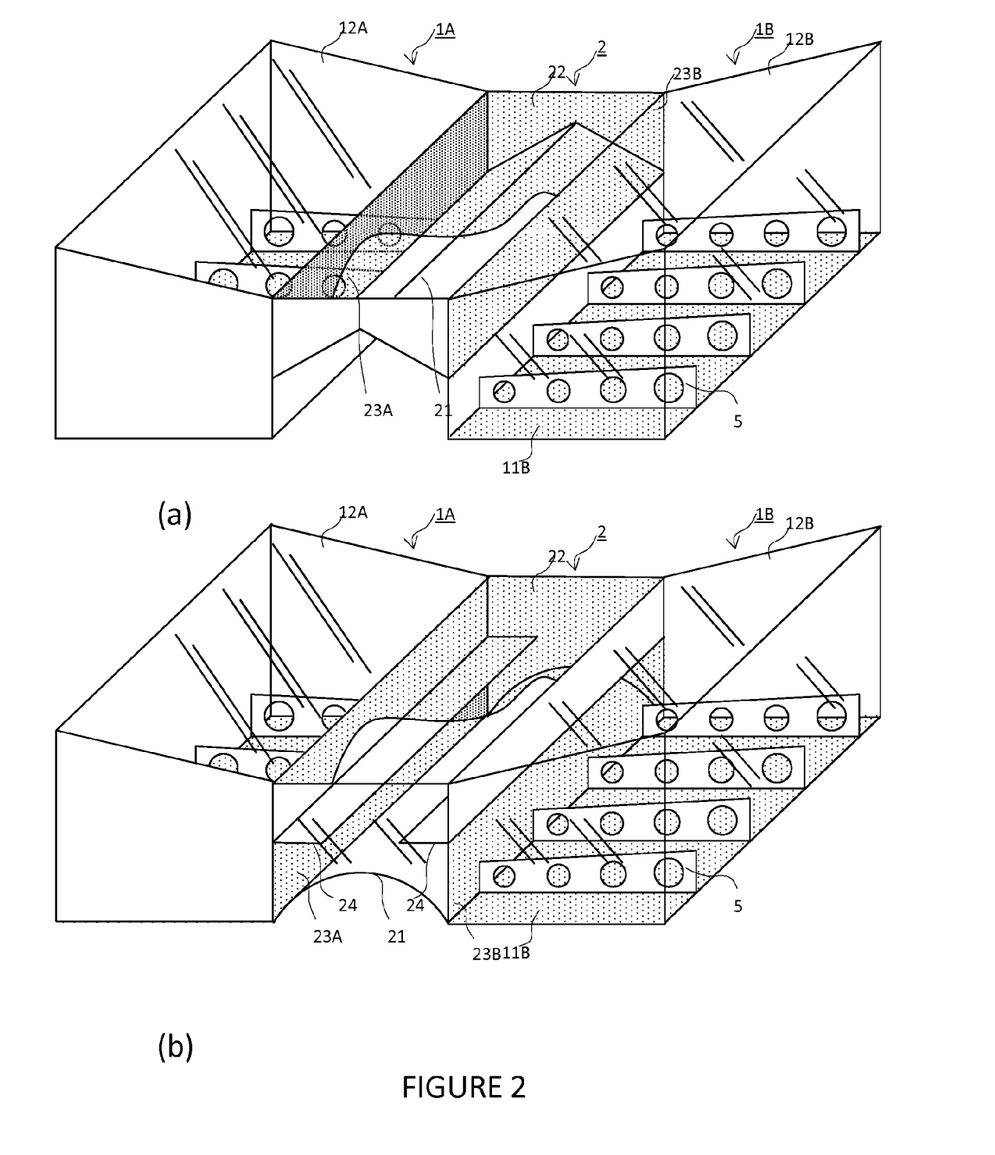
FIG. 2: shows schematic perspective views of bushing assemblies according to two embodiments of the present invention.

As illustrated in FIGS. 1 and 2, a bushing assembly according to the present invention comprises two tip plate assemblies (1A, 1B) extending along a longitudinal direction, arranged side by side. Each tip assembly (1A, 1B) comprises a floor comprising at least one tip plate (11A, 11B) in the form of a plate comprising tips through which glass fibres are attenuated, said floor being surrounded by side walls and end walls. The top of each tip plate assembly is closed by a ceiling (12A, 12B). The two tip plate assemblies are separated from one another by a stiffening rib structure (21) extending along said longitudinal direction, to reinforce the floor against creep. The stiffening rib structure (21) comprises a stiffening rib, preferably in the shape of a Λ or ∩, with the apex or convex side facing upstream, with respect to the glass melt flow direction (cf. e.g., FIG. 2(a)&(b)). The stiffening rib can be an integral part of the bushing assembly's floor, which is folded to form a Λ- or ∩-cross-section as illustrated in FIGS. 1(b) and 2(b), or it can be distinct from the bushing floor as illustrated in FIGS. 1(a)&(b). The stiffening rib structure (21) is preferably impervious to the liquid glass. For further reinforcing the tip plates against creep in the direction transverse to the longitudinal direction, a series of parallel stiffening gussets (5) extending substantially normal to the longitudinal direction can be mechanically coupled to the tip plates and to at least one side wall adjacent the corresponding tip plates.

Homogeneity of the glass melt is very important for the quality of the glass fibres thus produced. Screens, grids and baffles are usually interposed in the flow path of the glass melt to force splitting and deviations of the flow. Reinforcement of the bushing floor and homogenization of the glass melt are always achieved with separate means comprising: (a) a stiffening rib and (b) screens or baffles. The separation of these two functions is detrimental to the amount of precious metal required for the manufacturing of a bushing assembly as well as to the size of said bushing assembly. In the present invention, it is proposed for the first time to provide a single element in the form of a glass distribution manifold (2) fulfilling both mechanical and homogenization functions simultaneously. An integral part of the floor of said glass distribution manifold (2) comprises the stiffening rib structure (21). The manifold defines two separate fluid communication paths to the first and second tip plate assemblies (1A, 1B). It is advantageous if each of the separate paths from the manifold to each of the first and second tip plate assemblies comprises a screen, grid or perforated plate (23A, 23B) through which the liquid glass must flow to reach each tip plate assembly. Further splitting of the melt flow can be achieved by bringing the glass distribution manifold (2) in fluid communication with a source (3) of liquid glass located upstream through yet another screen, grid or perforated plate (22). As illustrated in FIG. 1 by the black arrows, with a very compact construction the melt flow is diverted and split abundantly, contributing to bringing glass melt of homogeneous composition and temperature into each tip plate assembly (1A, 1B) and through the corresponding tip plates (11A, 11B). Any type of screens, grids, or perforated plates (22, 23A, 23B) can be used to split the melt flow. If required, it is possible to interpose as illustrated in FIGS. 1(b) and 2(b) one or more additional screens or baffles (24) below the top screen (22) to further disrupt the flow. In order to prevent the formation of dead zones upstream from the manifold (2), where no or little flow occurs, the ceilings (12A, 12B) closing the top of the first and second tip plate assemblies (1A, 1B) and separating the tip plate assembly from the source (3) of liquid glass, are preferably sloping towards the grid or perforated plate (22) separating said source (3) from the manifold (2). As illustrated in FIG. 1, the slope of the ceilings (12A, 12B) of the manifold assemblies, which constitute a portion of the floor of the chamber upstream from the manifold, streamlines the flow of molten metal towards the manifold and prevents the formation of dead zones in particular at the corners.

The stiffening rib structure (21) may be reinforced on the outer side thereof by a core (25) made of refractory material as illustrated in FIG. 1(a). The refractory core can fill the space defined between the first and second tip plate assemblies (1A, 1B) and below the bottom side of the stiffening rib (21). The refractory material core can also be further reinforced by external stiffening metal supports (26) running along the longitudinal direction.

Figure 3:
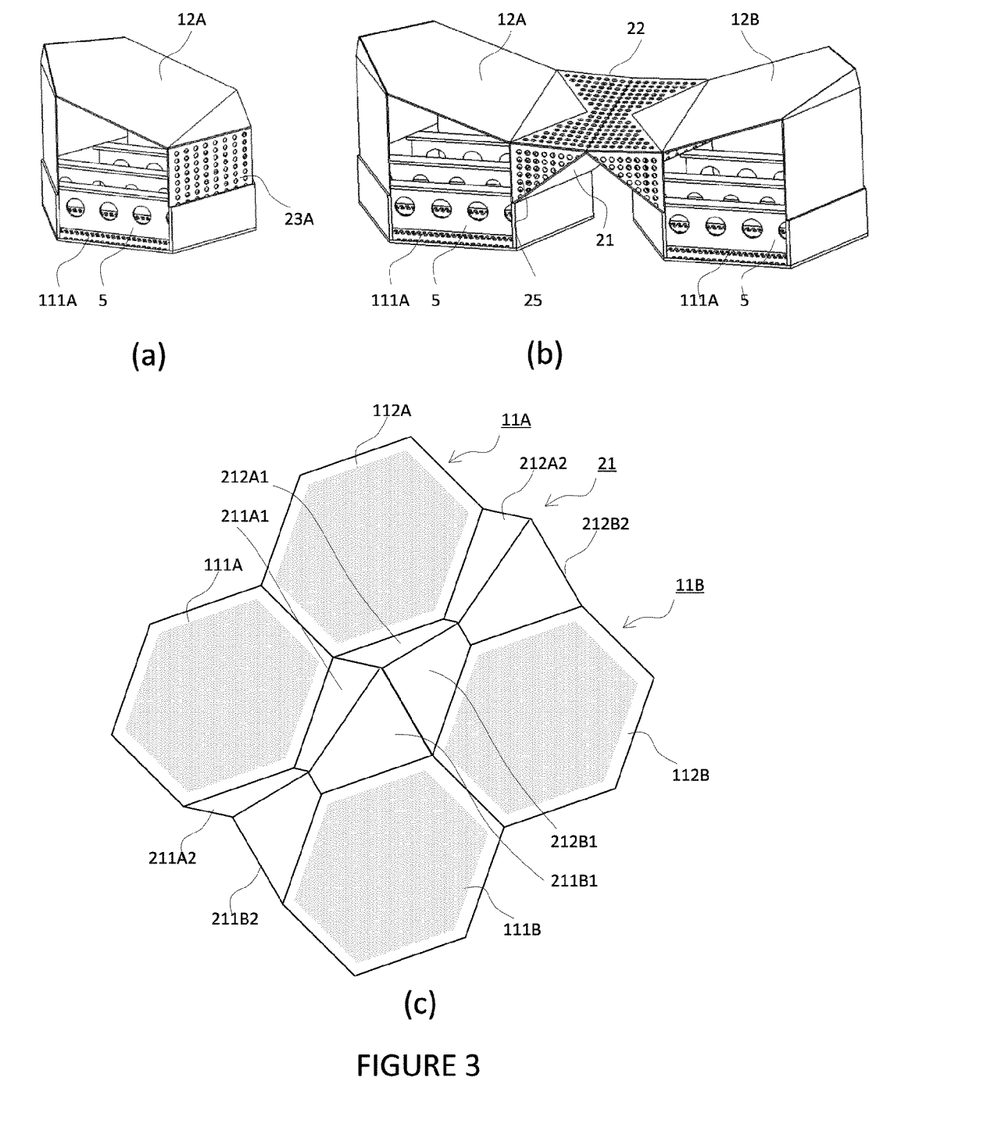
FIG. 3: shows.(a) a hexagonal tip plate module, (b) a pair of opposite hexagonal tip plate modules of (a) coupled to one another by a manifold, and (c) a view of the stiffening rib structure obtained with hexagonal tip plate modules.
Figure 4:
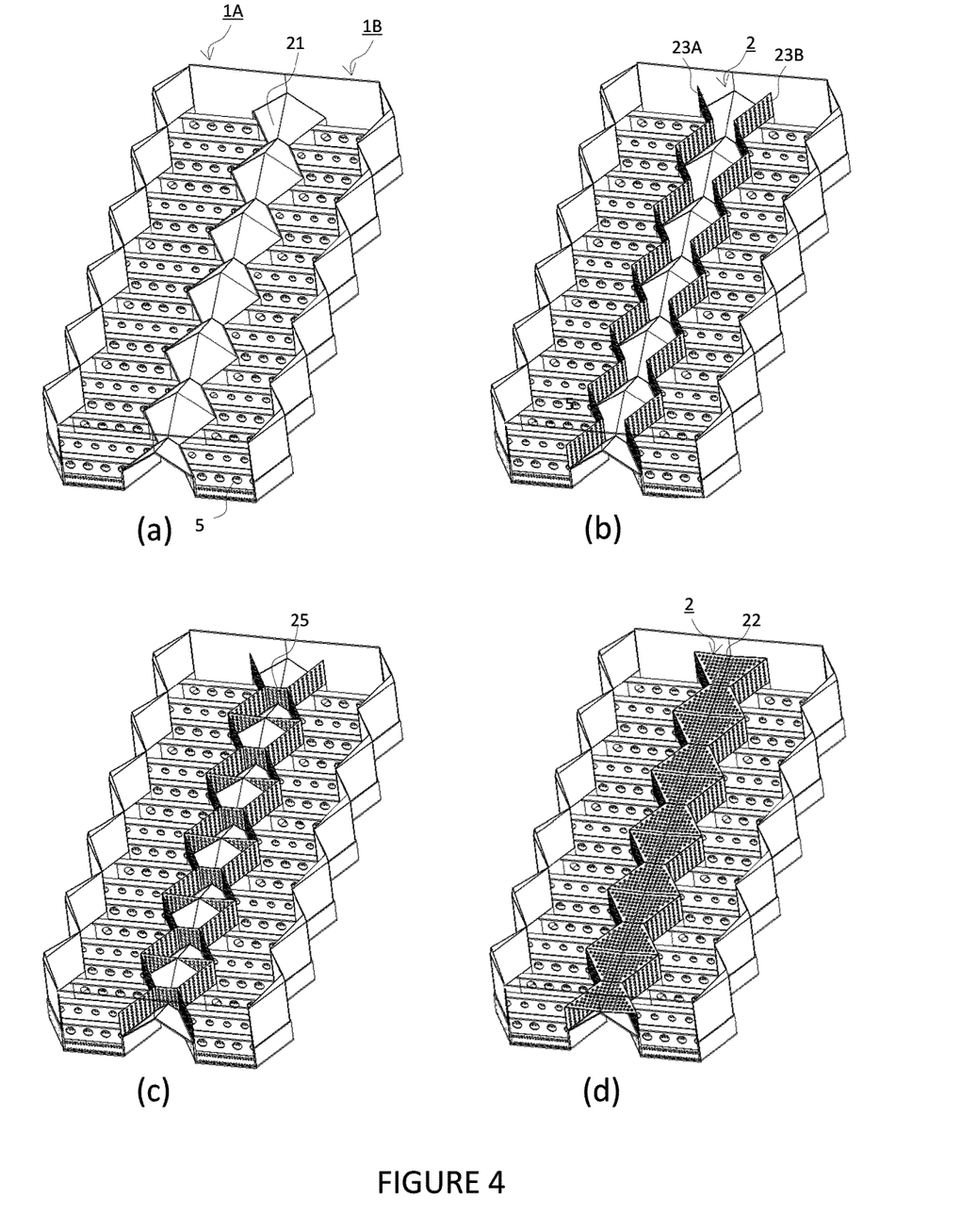
FIG. 4: shows a bushing assembly according to the present invention comprising several hexagonal tip plate modules as illustrated in FIG. 3, arranged side by side in two rows separated by a stiffening rib structure with addition of successive screens to define a manifold.

A bushing assembly according to the present invention comprises two tip plate assemblies (1A, 1B) separated by a manifold, which floor is in the shape of a stiffening rib. The first and second tip plate assemblies (1A, 1B) may have different geometries. In one embodiment illustrated in FIG. 2, each of the first and second tip plate assemblies (1A, 1B) comprises a single, substantially rectangular tip plate (11A, 11B). Such geometry is the closest to traditional bushing assemblies with the drawback that, in spite of the stiffening rib structure (21) and transverse gussets (5), the tip plates (11A, 11B) may still be quite sensitive to creep, especially for large capacity bushing assemblies with tip plates of 6000 or more holes. In an alternative design, each of the first and second tip plate assemblies (1A, 1B) comprises at least two tip plate modules aligned in fluid communication with each other along the longitudinal direction. This permits to reduce the distance from each point of the periphery of a tip plate towards its geometrical centre, which increases its resistance to creep. The tip plate of each module is preferably polygonal. It could be square or rectangular, but it is preferred that it have more than four edges. In particular, as illustrated in FIG. 3, it is preferred that the tip plate be hexagonal—not necessarily regular—comprising two opposite edges which are parallel. Two adjacent hexagonal modules would share one of said edge parallel to the opposite edge, such that a straight row can be formed by coupling side by side hexagonal modules by their pairs of opposite, parallel edges as shown in FIGS. 3(c) & 4. In a preferred embodiment illustrated in FIG. 3(a) & (b), the edges shared by two adjacent tip plates are not provided with a peripheral wall in order to allow free flow of the glass melt from one module to the next one in the longitudinal direction within one tip plate assembly (1A, 1B).

Figure 5:
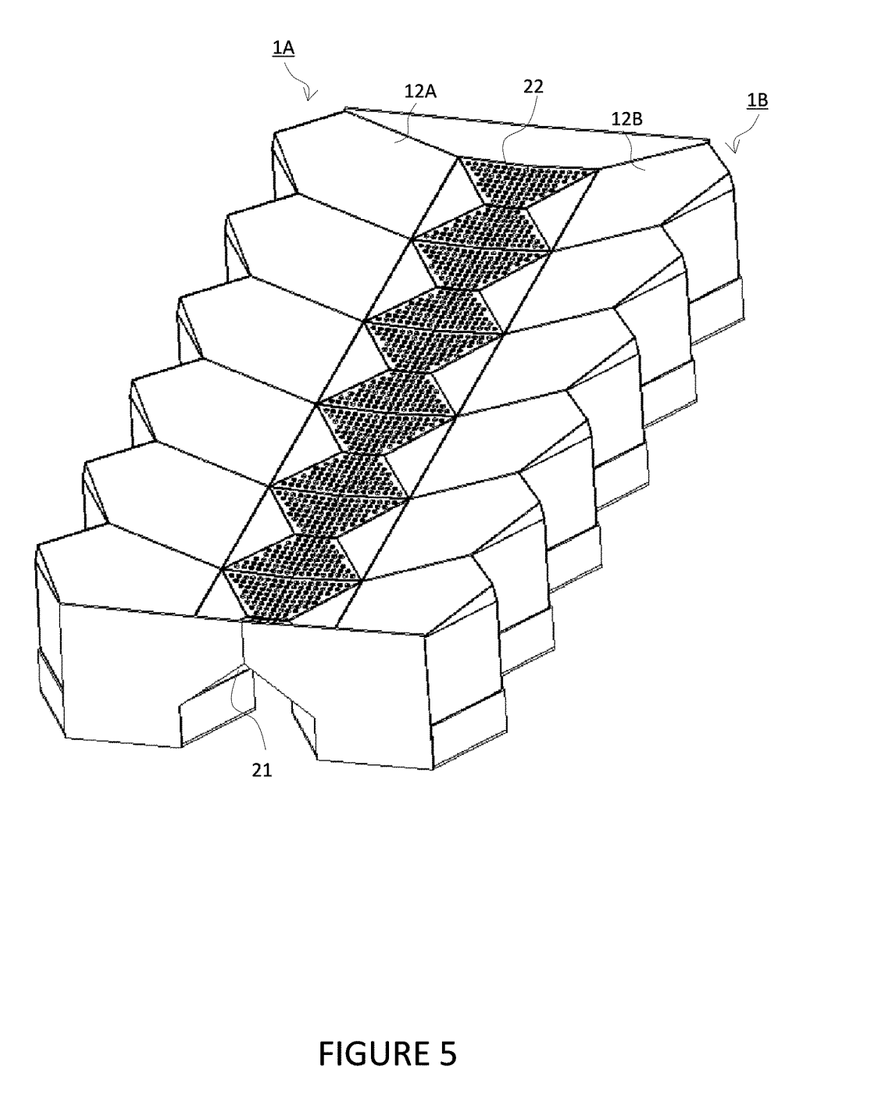
FIG. 5: shows a view of the completed bushing assembly of FIG. 4.

In a preferred embodiment illustrated in FIGS. 4 & 5, the first and second tip plate assemblies (1A, 1B) are each composed of a row of hexagonal tip plate modules coupled side by side by a pair of parallel edges, the two tip plate assemblies being separated by a manifold (2) which floor forms a stiffening rib structure (21). As can be seen in FIG. 3(c), the stiffening rib structure has a jagged upper ridge and is composed of flat panels extending from each edge of the hexagonal tip plates facing towards the manifold. Since two adjacent edges meeting at an apex of a first hexagonal tip plate (111A) face towards the manifold (2), two non-parallel panels (211A1, 211A2) are coupled to said first tip plate and form a concave edge extending from said apex to the ridge of the stiffening rib and thus form a V-shaped ridge. A corresponding second tip plate (111B) belonging to the second tip plate assembly (1B) also comprises a pair of panels (211B1, 211B2) extending from the two adjacent edges of the tip plate (111B) facing towards the manifold and thus form a V-shaped ridge through which the pairs of panels of the first and second tip plates (111A, 111B) are coupled. Coupling side by side in a row several such pairs of first and second tip plates (112A, 112B) yields the floor of a preferred bushing assembly according to the present invention. This multi-faceted stiffening rib not only reinforces the bushing floor against creep but also contributes to a further split of the flow of glass melt before it reaches the two tip plate modules (1A, 1B), though screens (23A, 23B).

FIG. 4 shows step by step the completion of the distribution manifold (2) which floor is defined by the stiffening rib (21). FIG. 4(a) shows a bushing assembly comprising a floor composed of two distinct tip plate assemblies (1A, 1B) separated by a stiffening rib (21) comparable (apart from the hexagonal shape of the tip plate modules) to a bushing assembly of the prior art. When FIG. 4 illustrates a bushing assembly composed of hexagonal modules as illustrated in FIG. 3(a), it is clear that the same principle can be applied mutatis mutandis to a bushing assembly comprising first and second substantially rectangular tip plate assemblies (1A, 1B) as illustrated e.g., in FIG. 2. In FIG. 4(a) the manifold (2) is being built by erecting on either side of the stiffening rib (21) two sets of screens or perforated panels (23A, 23B) jutting out of the bushing assembly floor and defining a volume defined between said two sets of screens and the stiffening rib, forming the floor thereof. The screens (23A, 23B) must be perforated to define a flow path between the interior of the manifold (2) and each of the first and second tip plate assemblies (1A, 1B). Additional screens or baffles (25) may be join the first and second sets of screens (23A, 23B) to impose splitting of the flow of melt in the longitudinal direction. Such transverse screens (25) are particularly useful in combination with a stiffening rib (21) having a jagged ridge as illustrated in FIG. 4(c), which drives the flow of molten glass in the longitudinal direction. It is clear that at this stage, baffles or additional screens (24) (not shown in FIG. 4, but illustrated in FIGS. 1(b) & 2(b) extending in the longitudinal direction and transverse to the first and second set of screens (23A, 23B) can be added to further deviate and split the flow of molten glass. Finally, the inner volume of the manifold is closed on top with screens (22) defining a flow path from a source of molten glass (3) located upstream of the manifold into the inner volume of the manifold. As illustrated in FIG. 5, in order to force the passage of the glass melt through the manifold whence it will be distributed into the first and second tip plate assemblies (1A, 1B) the top of the latter must be closed by a ceiling (12A, 12B), preferably sloped towards the screen (22) to drive the flow of molten glass towards the inlet of the manifold.

Finite element modelling has revealed that a bushing assembly according to the present invention permits to save considerable precious material compared with a traditional bushing assembly design of same capacity, comprising two rectangular tip plates separated by a rib. In particular, the preferred embodiment illustrated in FIG. 4 with hexagonal tip plates summing 6348 tips requires up to 13% less precious metal and yields 6% less creep than the conventional design. Adding to the superior mechanical properties of a bushing assembly according to the present invention the compact and integrated design of the manifold allowing an optimal temperature and composition homogenization of the glass melt in a reduced space and with further economy of material makes such bushing assemblies quite advantageous over the conventional designs.

The invention claimed is:

1. A bushing assembly comprising:
   (a) a liquid glass feeding unit arranged upstream of and in fluid communication with,
   (b) a first and second tip plate assemblies (1A, 1B) extending along a longitudinal direction, arranged side by side, and each surrounded by side walls and end walls and, the first and second tip plate assemblies being separated from one another by a stiffening rib structure (21) extending along said longitudinal direction,
   characterized in that, the feeding unit comprises a glass distribution manifold (2), which defines two separate fluid communication paths to the first and second tip plate assemblies (1A, 1B), and in that, the stiffening rib structure (21) forms an integral part of the floor of the manifold (2), the first and second tip plate assemblies (1A, 1B) each having a ceiling (12A, 12B), respectively sloping inwardly toward the stiffening rib structure (21).

2. The bushing assembly according to claim 1 wherein each of the separate paths from the manifold to each of the first and second tip plate assemblies comprises a grid or perforated plate (23A, 23B) through which the liquid glass must flow to reach each tip plate assembly.

3. The bushing assembly according to claim 1, wherein the glass distribution manifold (2) is in fluid communication with a source (3) of liquid glass located upstream through a grid or perforated plate (22).

4. The bushing assembly according to claim 1, wherein each of the first and second tip plate assemblies (1A, 1B) is closed on the top by a ceiling (12A, 12B) separating the tip plate assembly from a source (3) of liquid glass, wherein said ceiling is sloping towards the grid or perforated plate (22) separating said source (3) from the manifold (2).

5. The bushing assembly according to claim 1, wherein the stiffening rib structure (21) has a cross section in the shape of a ∧ or ∩, with the apex or convex side facing the interior of the manifold (2) receiving the liquid glass.

6. The bushing assembly according to claim 1, wherein the stiffening rib structure (21) is impervious to the liquid glass.

7. The bushing assembly according to claim 1, wherein each of the first and second tip plate assemblies (1A, 1B) comprises a single, substantially rectangular tip plate (11A, 11B).

8. The bushing assembly according to claim 1, wherein each of the first and second tip plate assemblies (1A, 1B) comprises at least two tip plate modules aligned in fluid communication with each other along the longitudinal direction.

9. The bushing assembly according to claim 1, comprising a series of parallel stiffening gussets (5) extending substantially normal to the longitudinal direction and mechanically coupled to the tip plates and to at least one side wall adjacent the corresponding tip plates.

10. A bushing assembly comprising:
    (a) a liquid glass feeding unit arranged upstream of, and in fluid communication with,
    (b) a first and second tip plate assemblies (1A, 1B) extending along a longitudinal direction., arraned side b side and each surrounded b side walls and end walls and the first and second tip plate assemblies being separated from one another by a stiffening rib structure (21) extending along said longitudinal direction, characterized in that, the feeding unit comprises a glass distribution manifold (2) which defines two separate fluid communication paths to the first and second tip plate assemblies (1A, 1B), and in that, the stiffening rib structure (21) forms an integral part of the floor of the manifold (2), wherein each tip plate module comprises a polygonal tip plate (111, 112) of more than four edges, two adjacent modules sharing a common edge of said polygon.

11. A bushing assembly comprising:
    (a) a liquid glass feeding unit arranged upstream of, and in fluid communication with,
    (b) a first and second tip plate assemblies (1A, 1B) extending along a longitudinal direction. arranged side by side, and each surrounded by side walls and end walls and, the first and second tip plate assemblies being separated from one another by a stiffening rib structure (21) extending along said longitudinal direction,
    characterized in that, the feeding unit comprises a glass distribution manifold (2), which defines two separate fluid communication paths to the first and second tip plate assemblies (1A, 1B), and in that, the stiffening rib structure (21) forms an integral part of the floor of manifold (2), wherein the portion of the stiffening rib structure (21) forming the floor of the manifold (2) is made of metal and the bottom thereof is supported by a core (25) made of refractory material, said refractory material core preferably comprising further external stiffening metal supports (26).

* * * * *